(12) United States Patent
Solon

(10) Patent No.: US 12,081,164 B2
(45) Date of Patent: Sep. 3, 2024

(54) MECHANICAL POWER TRANSMISSION BETWEEN SOLAR TRACKERS

(71) Applicant: SHOALS TECHNOLOGIES GROUP, LLC, Portland, TN (US)

(72) Inventor: Dean Solon, Portland, TN (US)

(73) Assignee: SHOALS TECHNOLOGIES GROUP, LLC, Portland, TN (US)

(*) Notice: Subject to any disclaimer, the term of this patent is extended or adjusted under 35 U.S.C. 154(b) by 0 days.

(21) Appl. No.: 18/058,689

(22) Filed: Nov. 23, 2022

(65) Prior Publication Data

US 2023/0163718 A1    May 25, 2023

Related U.S. Application Data

(60) Provisional application No. 63/264,573, filed on Nov. 24, 2021.

(51) Int. Cl.
*H02S 20/32* (2014.01)
*F16H 1/00* (2006.01)
*F16H 1/16* (2006.01)
*H02S 20/00* (2014.01)
*H02S 20/30* (2014.01)

(52) U.S. Cl.
CPC ............... *H02S 20/32* (2014.12); *F16H 1/00* (2013.01); *F16H 1/16* (2013.01); *H02S 20/00* (2013.01); *H02S 20/30* (2014.12)

(58) Field of Classification Search
CPC ......... H02S 20/32; H02S 20/00; H02S 20/30; F16H 1/00; F16H 1/16; Y02E 10/47; F24S 40/10; F24S 2030/12; F24S 2030/133; F24S 2030/134; F24S 2030/136; F24S 30/425
See application file for complete search history.

(56) References Cited

U.S. PATENT DOCUMENTS

| | | | |
|---|---|---|---|
| 9,766,319 | B2 | 9/2017 | Au |
| 2008/0308091 | A1 | 12/2008 | Corio |
| 2011/0139145 | A1 | 6/2011 | Mackamul |
| 2011/0186040 | A1 | 8/2011 | Liao |
| 2012/0160991 | A1 | 6/2012 | Kats et al. |
| 2012/0192666 | A1 | 8/2012 | De Cillia |
| 2014/0053825 | A1 | 2/2014 | Zhou |

(Continued)

OTHER PUBLICATIONS

International Search Report and Written Opinion dated Feb. 21, 2023, in related PCT App. No. PCT/US2022/080454, 11 pgs.

*Primary Examiner* — Michael Y Sun
(74) *Attorney, Agent, or Firm* — MASCHOFF BRENNAN

(57) ABSTRACT

In an example, a system to facilitate installation of a drive linkage in a solar array at or below an installation surface includes a housing and first and second interconnection assemblies. The housing is installed on or below the installation surface and is configured to at least partially enclose and protect the drive linkage at or below the installation surface. The first interconnection assembly extends between a first drive assembly of a first solar tracker supported above the installation surface by a support structure and a first end of the drive linkage at or below the installation surface. The second interconnection assembly extends between a second drive assembly of a second solar tracker supported above the installation surface by the support structure and a second end of the drive linkage at or below the installation surface.

16 Claims, 5 Drawing Sheets

(56) References Cited

U.S. PATENT DOCUMENTS

| | | |
|---|---|---|
| 2014/0090638 A1 | 4/2014 | Grushkowitz |
| 2014/0209147 A1 | 7/2014 | Cashion et al. |
| 2014/0338659 A1* | 11/2014 | Corio ............... F24S 30/425 126/714 |
| 2017/0093329 A1 | 3/2017 | Jensen |
| 2021/0058029 A1 | 2/2021 | Hilliard |

* cited by examiner

MECHANICAL POWER TRANSMISSION BETWEEN SOLAR TRACKERS

CROSS-REFERENCE TO RELATED APPLICATION

This application claims the benefit of and priority to U.S. Provisional App. No. 63/264,573 filed Nov. 24, 2021. The 63/264,573 application is incorporated herein by reference in its entirety.

FIELD

The embodiments discussed herein are related to mechanical power transmission between solar trackers.

BACKGROUND

Unless otherwise indicated herein, the materials described herein are not prior art to the claims in the present application and are not admitted to be prior art by inclusion in this section.

Solar trackers utilized in renewable energy production are devices that track the motion of the sun relative to the earth to maximize the production of solar energy. Solar trackers move to keep solar modules perpendicular to the sun in either one or two axes. The solar modules may include photovoltaic (PV) modules (e.g., modules that convert solar energy to electrical energy), solar thermal modules (e.g., modules that convert solar energy to thermal energy), or solar modules that convert solar energy to some other form.

The energy gain provided by solar trackers depends on the tracking geometry of the system and the location of the installation. A dual axis (D/A) solar tracker keeps the solar module perpendicular to the sun in two axes and provides the greatest gain in energy production at any location. Single axis (S/A) solar trackers are fixed in one axis and typically track the daily motion of the sun in the other axis. S/A solar tracker geometries include tilted elevation, azimuth, and horizontal. Tilted elevation S/A trackers are tilted as a function of the location's latitude and track the sun's daily motion about that tilted axis. Azimuth S/A solar trackers are tilted at an optimum angle and follow the daily motion of the sun by rotating about the vertical axis. Horizontal S/A solar trackers are configured parallel to the ground and rotate about a North/South horizontal axis to track the sun's daily motion. The energy gained varies for each type of tracking geometry and is dependent upon the latitude of the installation and the weather conditions at the installation location. Solar tracking systems for solar modules are commercially available in a variety of geometries, including S/A tilt and roll, S/A horizontal, S/A fixed tilt azimuth, and D/A geometries.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a system to facilitate installation of a drive linkage in a solar array at or below an installation surface includes a housing and first and second interconnection assemblies. The housing is installed on or below the installation surface and is configured to at least partially enclose and protect the drive linkage at or below the installation surface. The first interconnection assembly extends between a first drive assembly of a first solar tracker supported above the installation surface by a support structure and a first end of the drive linkage at or below the installation surface. The second interconnection assembly extends between a second drive assembly of a second solar tracker supported above the installation surface by the support structure and a second end of the drive linkage at or below the installation surface.

In another example embodiment, a solar array includes first and second solar trackers, a support structure, a drive linkage, and first and second interconnection assemblies. The first solar tracker includes a first torsion tube and a first drive assembly, the first drive assembly operably coupled to the first torsion tube to rotate the first torsion tube responsive to input mechanical power. The second solar tracker includes a second torsion tube and a second drive assembly, the second drive assembly operably coupled to the second torsion tube to rotate the second torsion tube responsive to input mechanical power. The support structure supports the first and second solar trackers above an installation surface. The drive linkage is positioned at or below the installation surface and is configured to transmit mechanical power between the first and second solar trackers. The first interconnection assembly operably couples a first end of the drive linkage at or below an installation surface to the first drive assembly supported above the installation surface by the support structure. The second interconnection assembly operably couples a second end of the drive linkage at or below the installation surface to the second drive assembly supported above the installation surface by the support structure.

In another example embodiment, a method includes transmitting mechanical power through a drive linkage located at or below an installation surface of a solar array to an interconnection assembly operably coupled to the drive linkage. The method includes transmitting the mechanical power vertically upward through the interconnection assembly to a drive assembly operably coupled to a torsion tube of the solar array. The method includes rotating the torsion tube in response to receiving the mechanical power at the drive assembly. The method includes rotating solar modules of the solar array that are coupled to the torsion tube in response to rotating the torsion tube.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
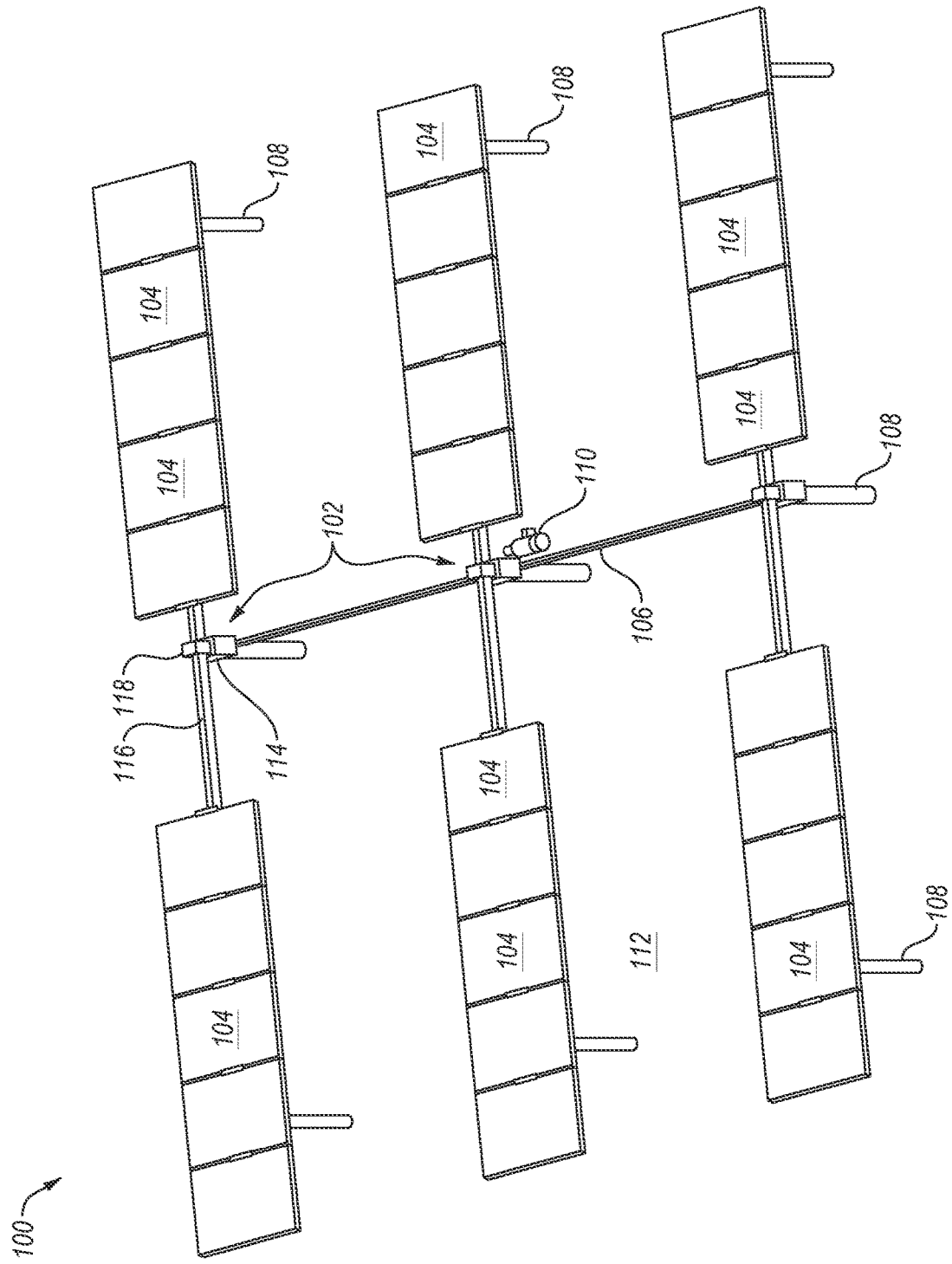
FIG. 1 illustrates a prior art solar array that includes solar trackers and PV modules.

Solar tracker systems include one or more motors or other drive mechanism to rotate the solar trackers that support the solar modules about one or two axes to track the motion of the sun relative to the earth throughout the day. To reduce costs, a given motor may be shared between two or more solar trackers, e.g., by coupling the motor via drive linkages to the solar trackers. The drive linkages transmit mechanical power from the motor to each of the solar trackers to rotate each solar tracker.

Drive linkages extending between solar trackers and/or between the motor and the solar trackers are installed above ground level, typically about 18 inches above ground level. Solar arrays with such solar trackers may include numerous solar modules. The solar modules and/or the solar trackers of solar arrays require periodic maintenance and/or repair. The location of the drive linkages, e.g., 18 inches or other height above ground level, impedes or hinders access to solar modules and/or solar trackers of the solar array when maintenance or repairs are needed. For example, any such drive linkages extending between solar trackers and corresponding solar modules prevent a vehicle carrying tools and/or replacement parts from passing between the rows to reach any of the solar trackers and/or solar modules located past one or more drive linkages. Such drive linkages may alternatively or additionally slow or imperil a worker on foot trying to reach any of the solar trackers or solar modules located past one or more such drive linkages.

In comparison, some embodiments herein route drive linkages at or below ground level or more generally at or below an installation surface (e.g., ground level for a ground-mounted solar array, a rooftop for a roof-mounted solar array, etc.). In more detail, the solar trackers of a solar array may include torsion tubes to which PV modules are mounted and drive assemblies mounted above the installation surface to support columns. Each drive assembly may include one or more gears (e.g., worm gears, spur gears, sector gears), sprockets, pulleys, motor drives, gear boxes, cable drives, chains, belts, or the like and may generally be configured to apply mechanical power supplied by a drive linkage to rotate a torsion tube and its corresponding PV modules. However, the drive linkages may be routed at or below the installation surface through a raceway, conduit, and/or other housing components that house the drive linkages at or below the installation surface. The drive linkages may interconnect with the drive assemblies of the solar trackers through interconnection assemblies, each of which may include one or more gears, sprockets, pulleys, gear boxes, chains, belts, driveshafts, or other interconnection components. The interconnection assemblies may be considered part of or separate from the drive linkage(s). In an example implementation, each interconnection assembly operably couples a drive linkage positioned at or below the installation surface to a drive assembly of the solar tracker. A drive linkage may be considered to be "at" an installation surface if a rotational axis of the drive linkage is not more than 2 inches, 4 inches, or 6 inches above the installation surface. The drive linkage is supported at both ends by pillow block bearings which may be included as part of the drive linkage and/or the interconnection assembly. The interconnection assembly includes a lower sprocket coupled to one end of the drive shaft, an upper sprocket spaced apart from and above the lower sprocket and coupled to a shaft of a drive assembly of the solar tracker, and a drive chain that mechanically couples the upper and lower sprockets together. The shaft is operably coupled (directly or through one or more other components) to rotate the solar tracker responsive to input mechanical power received from the driveshaft through the interconnection assembly.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 illustrates a prior art solar array 100 that includes solar trackers 102 and PV modules 104. Only some of the solar trackers 102 and PV modules 104 are labeled for simplicity. This labeling convention is implemented for all components in all figures herein. The solar array 100 further includes drive linkages 106, support columns 108, and drive mechanism 110. The drive mechanism 110 may include a drive motor or other suitable drive mechanism. The drive linkages 106 transmit mechanical power generated by the drive mechanism 110 between solar trackers 102. The support columns 108 support the solar trackers 102 and/or PV modules 104 above an installation surface 112. The installation surface 112 may include ground, a roof of a building or upper surface of other structure, or other suitable installation surface.

The solar trackers 102 include drive assemblies 114 and torsion tubes 116. Each torsion tube 116 is rotatably supported by one or more support columns 108. For example, each support column 108 may include or have attached at its upper end a bearing 118 with bearing surfaces such as no maintenance polymer bushings. The torsion tubes 116 are received through the bearings 118 atop the support columns 108, the PV modules 104 being mounted to the torsion tubes 116 using any suitable couplers such as U bolts, clamps, or the like. In the illustrated example, each drive assembly 114 includes a worm-gear drive box. The drive mechanism 110 drives each worm-gear drive box directly or indirectly via a corresponding one of the drive linkages 106. In turn, each worm-gear drive box rotates a corresponding one of the torsion tubes 116, thereby causing the PV modules 104 mounted to the torsion tubes 116 to rotate.

As illustrated in FIG. 1, the drive linkages 106 are installed above the installation surface 112, at or near the upper end of each support column 108. In a typical installation, the drive linkages 106 may be installed about 18 inches above ground level, for instance. As illustrated in FIG. 1, a vehicle would be unable to pass completely between solar trackers 102 and/or rows of PV modules 104 when the drive linkages 106 are installed. The vehicle could be driven around the solar array 100 to access the other side but this may be slow and/or cumbersome. While a worker could potentially step over any of the drive linkages 106 to pass from one side to the other, this may slow the worker and/or create a risk of tripping the worker as the worker steps from one side of the drive linkage 106 to the other. Alternatively or additionally, the drive linkages 106 may interfere with or slow grounds maintenance equipment such as lawn mowers.

Figure 2:
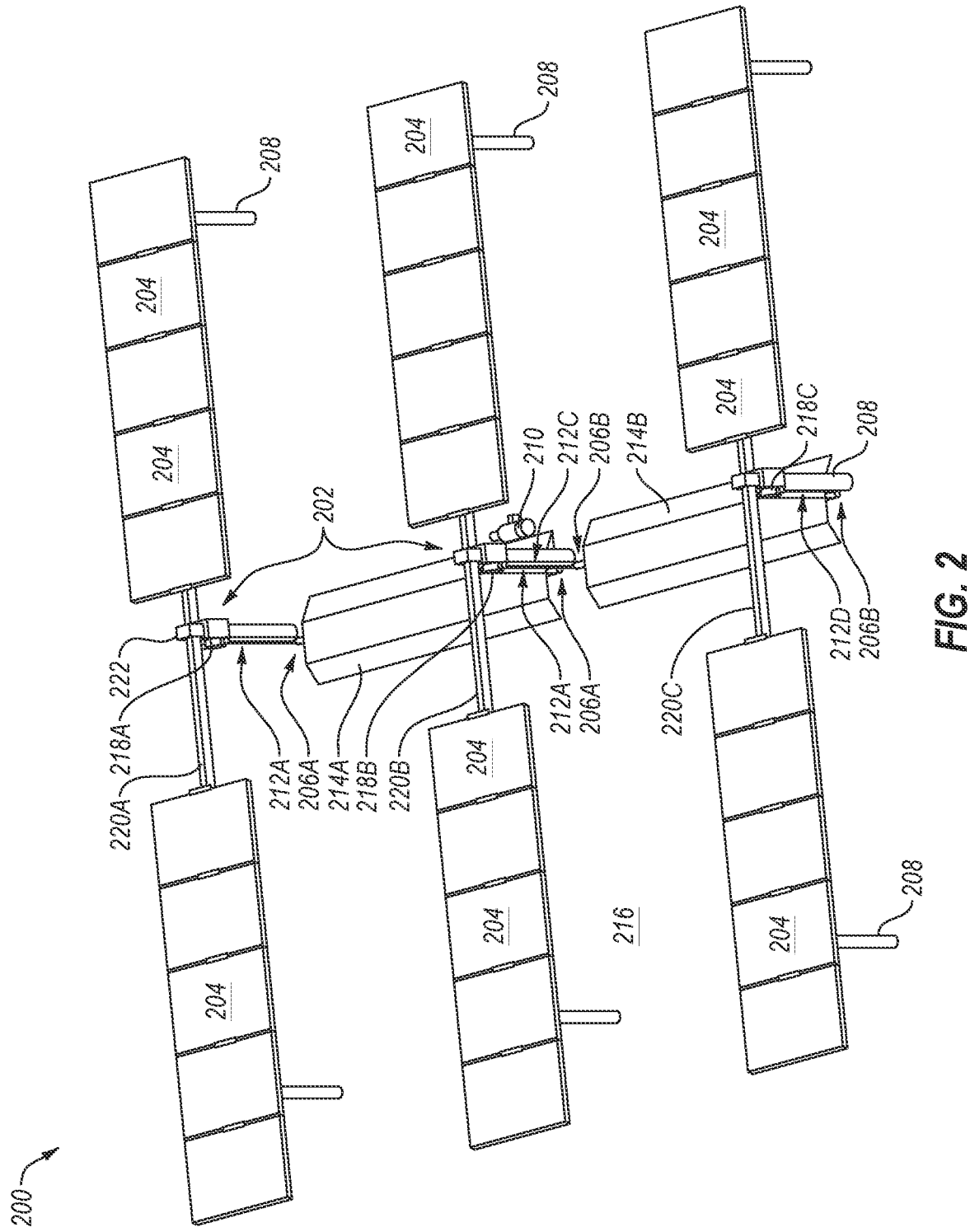
FIG. 2 illustrates a solar array with one or more drive linkages installed at or below an installation surface, arranged in accordance with at least one embodiment described herein.

Embodiments herein include solar arrays with one or more drive linkages installed at or below an installation surface to permit vehicles, workers, grounds maintenance equipment, or the like to more easily and/or safely pass over. For example, FIG. 2 illustrates a solar array 200 with one or more drive linkages installed at or below an installation surface, arranged in accordance with at least one embodiment described herein. The solar array 200 includes solar trackers 202, PV modules 204, drive linkages 206 (including 206A, 206B), support columns 208, drive mechanism 210, interconnection assemblies 212 (including 212A, 212B, 212C, 212D), and drive linkage housings 214 (including 214A, 214B). The drive mechanism 210 may include a drive motor or other suitable drive mechanism. The drive linkages 206 transmit mechanical power generated by the drive mechanism 210 between solar trackers 202. The support columns 208 support the solar trackers 202 and/or PV modules 204 above an installation surface 216. The installation surface 216 may include ground, a roof of a building or upper surface of other structure, or other suitable installation surface.

As illustrated, each housing 214 is installed on the installation surface 216, e.g., at ground level or the installation surface, and may at least partially enclose and protect the drive linkage 206 from the environment and/or vehicles, workers, etc., that pass over the drive linkage 206. For example, the housing 214 may have sufficient structural strength to permit vehicles, workers, etc. to drive, walk, or otherwise pass over it, and thus over the drive linkage 206, without damaging or contacting the drive linkage 206. In this and other embodiments, the housing 214 may also at least partially enclose electrical wiring such as may be implemented as an electrical output bus in a PV array, plumbing such as may be implemented as a thermal output bus in a solar thermal array, or the like. In the illustrated embodiment, the housing 214 is implemented as a raceway of plastic, galvanized steel, or other suitable material installed on the installation surface 216. More generally, the housing 214 may include a raceway, e.g., an above-ground raceway, a conduit, e.g., a below-ground conduit installed in a trench below the installation surface 216, or other suitable housing installed on or below the installation surface 216.

The drive linkages 212 may be coupled to or mounted on or in the housings 214 and/or the installation surface 216, e.g., with pillow block bearings, as described in more detail below.

The solar trackers 202 include drive assemblies 218 (including 218A, 218B, 218C) and torsion tubes 220 (including 220A, 220B, 220C). Each torsion tube 220 is rotatably supported by one or more support columns 208. For example, each support column 208 may include or have attached at its upper end one or more bearings 222 with bearing surfaces such as no maintenance polymer bushings. The torsion tubes 220 are received through the bearings 222 atop the support columns 208. The solar modules (not shown in FIG. 2) are mounted to the torsion tubes 220 using couplers, U bolts, clamps, or other suitable couplers.

As illustrated, the solar array 200 includes fewer drive mechanisms 210 than torsion tubes 220, the drive mechanism 210 being shared between all three of the illustrated torsion tubes 220. The drive mechanism 210 is coupled to the drive assembly 218B without any intervening drive linkages 206 or linkage assemblies 212. For example, the drive mechanism 210 may be directly coupled to the drive assembly 218B. Mechanical power output by drive mechanism 210 may be coupled into the drive assembly 212B to rotate the torsion tube 220B.

Each interconnection assembly 212 may generally be configured to relocate and/or transmit mechanical power vertically, e.g., from one of the drive assemblies 218 above the installation surface 216 to one of the drive linkages 206 at or below the installation surface 216 or from one of the drive linkages 206 at or below the installation surface 216 to one of the drive assemblies 218 above the installation surface 216. Each interconnection assembly 212 may generally be coupled between a drive assembly 218 and an end of a drive linkage 206. For example, the interconnection assembly 212A is coupled between the drive assembly 218A and one end of the drive linkage 206A, the interconnection assembly 212B is coupled between the drive assembly 218B and the other end of the drive linkage 206A, the interconnection assembly 212C is coupled between the drive assembly 218B and one end of the drive linkage 206B, and the interconnection assembly 212D is coupled between the drive assembly 218C and the other end of the drive linkage 206B.

As already mentioned, mechanical power output by drive mechanism 210 may be coupled to the drive assembly 212B. Some of the mechanical power is relocated and/or transmitted vertically downward from the drive assembly 212B through the interconnection assembly 212B into the drive linkage 206A. The mechanical power is then transmitted through the drive linkage 206A into the interconnection assembly 212A and vertically upward through the interconnection assembly 212A to the drive assembly 218A to rotate the torsion tube 220A. Similarly, some of the mechanical power is relocated and/or transmitted vertically downward from the drive assembly 212C through the interconnection assembly 212C into the drive linkage 206B. The mechanical power is then transmitted through the drive linkage 206B into the interconnection assembly 212D and vertically upward through the interconnection assembly 212D to the drive assembly 218C to rotate the torsion tube 220C.

Each interconnection assembly 212 may include any combination of two or more interconnection components to relocate and/or transmit mechanical power vertically between drive assemblies 218 and drive linkages 206, such as sprockets, gears, pulleys, chains, driveshafts, belts, or other interconnection components. An example implementation is described in more detail below in connection with FIGS. 3A-3C.

Figure 3A:
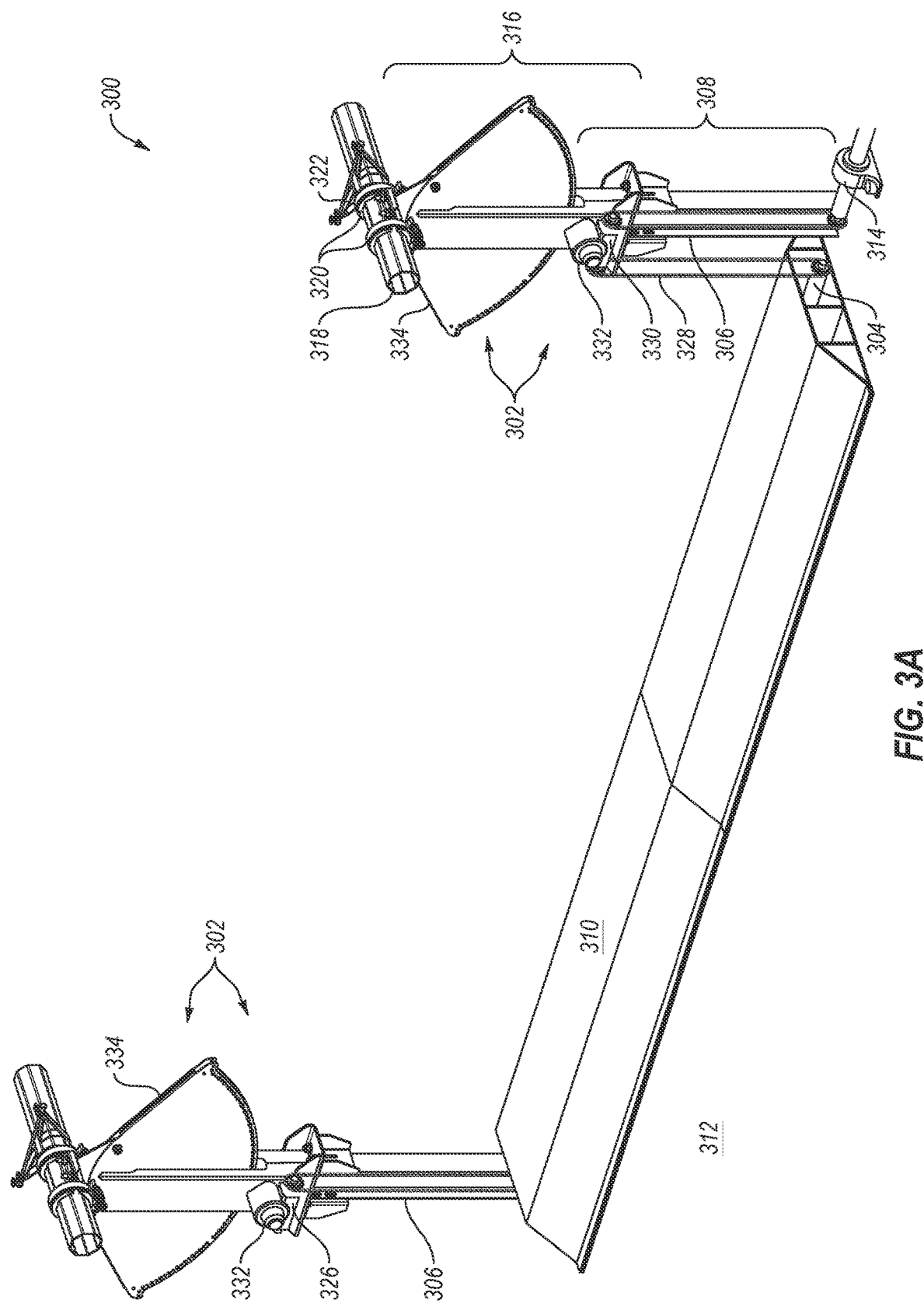
FIGS. 3A-3C illustrate portions of another example solar array with one or more drive linkages installed at or below an installation surface, arranged in accordance with at least one embodiment described herein.
Figure 3B:
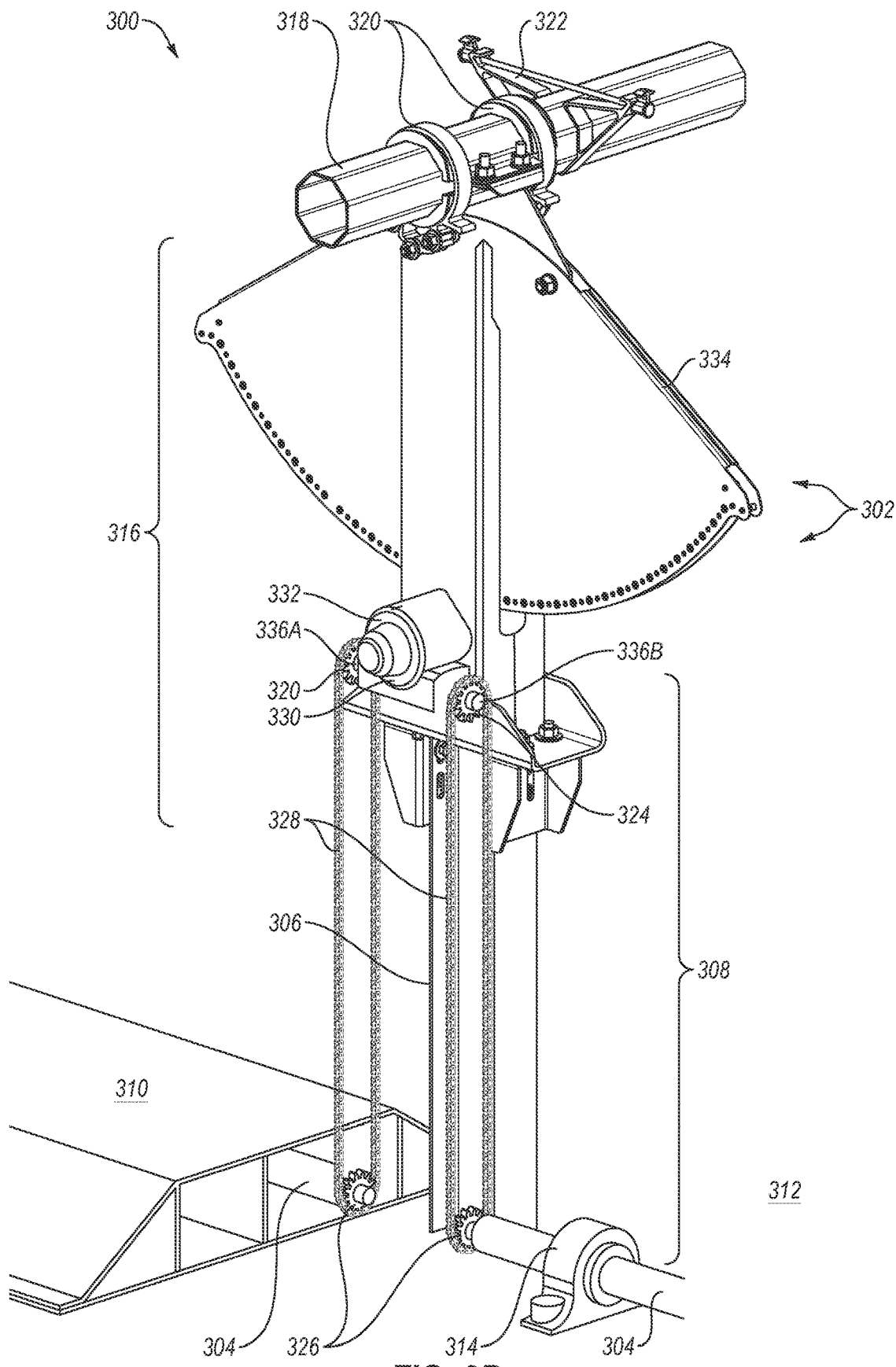
Figure 3C:
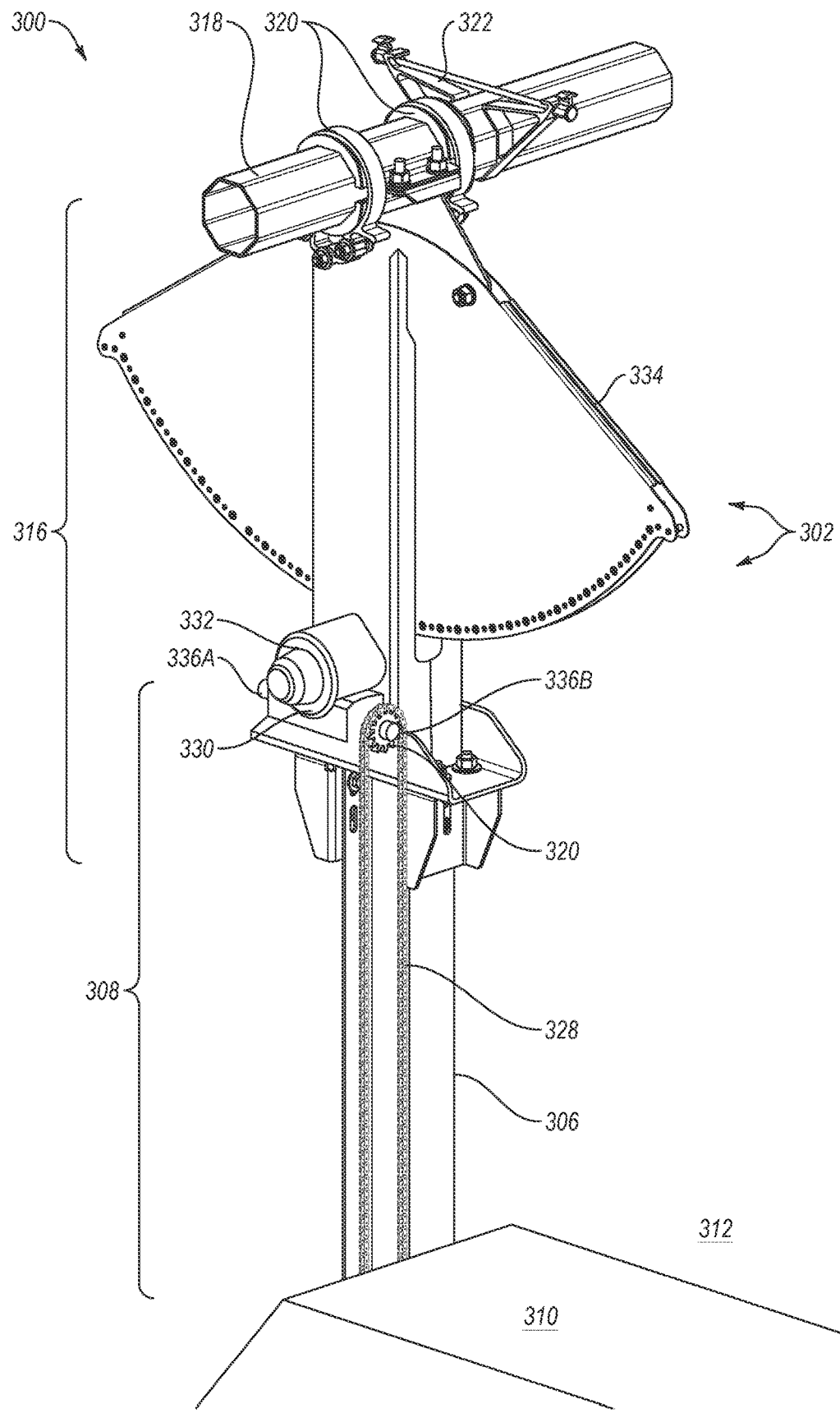

FIGS. 3A-3C illustrate portions of another example solar array 300 array with one or more drive linkages installed at or below an installation surface, arranged in accordance with at least one embodiment described herein. FIG. 3A is a perspective view of the solar array 300 and FIGS. 3B and 3C include detail views thereof. The solar array 300 of FIGS. 3A-3C includes solar trackers 302, PV modules or other solar modules (not shown in FIGS. 3A-3C) such as the PV modules 204 of FIG. 2, drive linkages 304, support columns 306 (or other support structures), at least one drive mechanism (not shown in FIGS. 3A-3C), interconnection assemblies 308, and drive linkage housings 310 (hereinafter "housings 310" or "housing 310") (only one housing 310 is depicted in FIGS. 3A-3C but more generally each drive linkage 304 may be at least partially enclosed within such a housing 310). The drive mechanism may include a drive motor or other suitable drive mechanism. The drive linkages 304 transmit mechanical power generated by the drive mechanism between solar trackers 302. The support columns 306 support the solar trackers 302 and/or PV modules above an installation surface 312. The installation surface 312 may include ground, a roof of a building or upper surface of other structure, or other suitable installation surface. The various components of the solar array 300 may include, be included in, or correspond to the similarly named components of the solar array 200 of FIG. 2.

As illustrated, the housing 310 is installed on the installation surface 312, e.g., at ground level, and may at least partially enclose and protect the drive linkage 304 from the environment and/or vehicles, workers, etc., that pass over the drive linkage 304. For example, the housing 310 may have sufficient structural strength to permit vehicles, workers, etc. to drive, walk, or otherwise pass over it, and thus over the drive linkage 304, without damaging or contacting the drive linkage 304. In this and other embodiments, the housing 310 may also at least partially enclose electrical wiring such as may be implemented as an electrical output bus in a PV array, plumbing such as may be implemented as a thermal output bus in a solar thermal array, or the like. In the illustrated embodiment, the housing 310 is implemented as a raceway of plastic, galvanized steel, or other suitable material installed on the installation surface 312. More generally, the housing 310 may include a raceway, e.g., an above-ground raceway, a conduit, e.g., a below-ground conduit installed in a trench below the installation surface 312, or other suitable housing installed on or below the installation surface 312.

The drive linkages 304 may be coupled to or mounted on or in the housing 310 and/or the installation surface 312 with pillow block bearings 314, only one of which is visible in FIGS. 3A and 3B. In some embodiments, at least two pillow block bearings 314 couple or mount each drive linkage 304 to a corresponding housing 310 and/or the installation surface 312, including one pillow block bearing 314 at each end of the drive linkage 304. The end of each drive linkage 304 may be received through a corresponding pillow block bearing 314 which may support rotation of the drive linkage 304 relative to, e.g., the housing 310.

The solar trackers 302 include drive assemblies 316 and torsion tubes 318. Each torsion tube 318 is rotatably supported by one or more support columns 306. For example, each support column 306 may include or have attached at its upper end one or more bearings 320 with bearing surfaces such as no maintenance polymer bushings. The torsion tubes 318 are received through the bearings 320 atop the support columns 306. The solar modules (not shown in FIGS. 3A-3C) are mounted to the torsion tubes 318 using couplers 322, U bolts, clamps, or other suitable couplers.

Each interconnection assembly 308 may generally be configured to relocate and/or transmit mechanical power vertically, e.g., from one of the drive assemblies 316 above the installation surface 312 to one of the drive linkages 304 at or below the installation surface 312 or from one of the drive linkages 304 at or below the installation surface 312 to one of the drive assemblies 316 above the installation surface 312. For example, suppose in FIG. 3A mechanical power is generated by a drive motor or other drive mechanism (not shown in FIG. 3A) and transmitted through the rightmost drive linkage 304. In this example, the rightmost interconnection assembly 308 coupled between the rightmost drive linkage 304 and the rightmost drive assembly 316 may relocate and/or transmit mechanical power from the rightmost drive linkage 304 vertically upward to the rightmost drive assembly 316. Further in this example, the middle interconnection assembly 308 coupled between the rightmost drive assembly 316 and the leftmost drive linkage 304 may relocate and/or transmit mechanical power vertically downward from the rightmost drive assembly 316 to the leftmost drive linkage 304. Further still in this example, the leftmost interconnection assembly 308 coupled between the leftmost drive linkage 304 and the leftmost drive assembly 316 may relocate and/or transmit mechanical power vertically upward from the leftmost drive linkage 304 to the leftmost drive assembly 316. By vertically relocating mechanical power between the drive assemblies 316 and the drive linkages 304, the drive linkages 304 may be installed at or below the installation surface 312 where they are less likely to interfere with vehicles, workers, grounds maintenance equipment, etc. while the solar trackers 302, including their drive assemblies 316, may remain supported above the installation surface 312 where necessary to enable solar tracking.

Each interconnection assembly 308 may include any combination of two or more interconnection components to relocate and/or transmit mechanical power vertically between drive assemblies 316 and drive linkages 304, such as sprockets, gears, pulleys, chains, driveshafts, or other interconnection components. In the illustrated embodiment, and referring to FIGS. 3B and 3C, each interconnection assembly 308 includes one or two upper sprockets 324, one or two lower sprockets 326, and one or two drive chains 328. Each upper sprocket 324 is operably coupled to a corresponding one of the drive assemblies 316. Each lower sprocket 326 is operably coupled to a corresponding end of a corresponding one of the drive linkages 304. Each drive chain 328 operably couples a corresponding one of the upper sprockets 324 and a corresponding one of the lower sprockets 326 together.

Each upper sprocket 324 is axially aligned with and coupled to a shaft (e.g., of a worm gear as described below) of the corresponding drive assembly 316 such that the upper sprocket 324 rotates with the shaft in response to rotation of the shaft and/or such that the shaft rotates in response to rotation of the upper sprocket 324. Each lower sprocket 326 is axially aligned with and coupled to the end of the corresponding drive linkage 304 such that the lower sprocket 326 rotates with the drive linkage 304 in response to rotation of the drive linkage 304 and/or such that the drive linkage 304 rotates in response to rotation of the lower sprocket 326. The upper and lower sprockets 324, 326 have teeth that mesh with the corresponding drive chain 328 such that rotation of the upper sprocket 324 translates through the drive chain 328 to rotation of the lower sprocket 326 and/or such that rotation of lower sprocket 326 translates through the drive chain 328 to rotation of the upper sprocket 324. The couplings between the various components of the interconnection assembly 308 result in mechanical power received from one of the drive linkages 304 at the corresponding lower sprocket 326 being output at the corresponding upper sprocket 324 to the corresponding drive assembly 316 and/or in mechanical power received from one of the drive assemblies 316 at the corresponding upper sprocket 324 being output at the corresponding lower sprocket 326 to the corresponding drive linkage 304.

In the illustrated example, each drive assembly 316 includes a worm-gear drive box 330, a spur-gear drive box 332, and a sector gear 334. Each worm-gear drive box 330 includes a worm gear (not shown in FIGS. 3A-3C) with one or two exposed end shafts 336A, 336B (not labeled in FIG. 3A) (hereinafter collectively "end shafts 336" or generically "end shaft 336"). One or both of the end shafts 336 may each be operably coupled to a corresponding one of the upper sprockets 324. The upper sprocket 324 is axially aligned with and operably coupled to the corresponding end shaft 336 such that rotation of the upper sprocket 324 rotates the corresponding worm gear and/or rotation of the corresponding worm gear rotates the upper sprocket 324.

Each spur-gear drive box 332 includes a first and second spur gear (not shown). The first spur gear meshes with the worm gear of the worm-gear drive box 330 such that rotation of the worm gear rotates the first spur gear and/or rotation of the first spur gear rotates the worm gear. The second spur gear is formed on or coupled to a same shaft as the first spur gear, the first and second spur gears sharing a common axis, such that rotation of the first spur gear rotates the second spur gear and/or rotation of the second spur gear rotates the first spur gear.

Each sector gear 334 is mounted to a corresponding torsion tube 318. The sector gear 334 meshes with the corresponding second spur gear of the corresponding spur-gear drive box 332 and is configured to rotate in response to rotation of the second spur gear. When solar modules are mounted to the torsion tube 318, the solar modules may thereby be rotated throughout the day for solar tracking by rotating the torsion tube 318 through operation of the corresponding drive linkages 304, interconnection assemblies 308, and drive assemblies 316 as described herein.

Substitutions, modifications, additions, etc. may be made to FIGS. 3A-3C without altering the scope of the disclosure. For example, the interconnection assemblies 308 may be implemented with different, additional, fewer, and/or modified interconnection components. Similarly, the drive assemblies 316 may be implemented with different, additional, fewer, and/or modified components.

At least one embodiment herein may include a system to facilitate installation of a drive linkage in a solar array at or below an installation surface. The system may include a housing and first and second interconnection assemblies. The housing may be installed on or below the installation surface and may be configured to at least partially enclose and protect the drive linkage at or below the installation surface. An example of such a housing is illustrated as the housings 214 in FIG. 2 and the housing 310 in FIGS. 3A-3C. The first interconnection assembly may extend between a first drive assembly of a first solar tracker supported above the installation surface by a support structure and a first end of the drive linkage at or below the installation surface. An example of such first interconnection assembly, first drive assembly, first solar tracker, support structure, and first end of the drive linkage are illustrated in FIG. 3A as, respectively, the middle interconnection assembly 308, the rightmost drive assembly 316, the rightmost solar tracker 302, the rightmost support column 306 (all of the support columns 306 collectively forming a support structure which could alternatively take a form other than support columns), and the rightmost end of the leftmost drive linkage 304. The second interconnection assembly may extend between a second drive assembly of a second solar tracker supported above the installation surface by the support structure and a second end of the drive linkage at or below the installation surface. An example of such second interconnection assembly, second drive assembly, second solar tracker, support structure, and second end of the drive linkage are illustrated in FIG. 3A as, respectively, the leftmost interconnection assembly 308, the leftmost drive assembly 316, the leftmost solar tracker 302, the leftmost support column 306 (all of the support columns 306 collectively forming a support structure which could alternatively take a form other than support columns), and the leftmost end of the leftmost drive linkage 304 (the leftmost end of the leftmost drive linkage 304 not being visible in FIGS. 3A-3C).

At least one other embodiment herein may include a solar array, that includes first and second solar trackers, solar modules, a support structure, a drive linkage, and first and second interconnection assemblies. The first solar tracker may include a first torsion tube and a first drive assembly, examples of which include the rightmost solar tracker 302, the rightmost torsion tube 318, and the rightmost drive assembly 316. The first drive assembly may be operably coupled to the first torsion tube to rotate the first torsion tube responsive to input mechanical power. The second solar tracker may include a second torsion tube and a second drive assembly, examples of which include the leftmost solar tracker 302, the leftmost torsion tube 318, and the leftmost drive assembly 316. The second drive assembly may be operably coupled to the second torsion tube to rotate the second torsion tube responsive to input mechanical power. The solar modules may be coupled to the first and second torsion tubes. The support structure may support the first and second solar trackers above an installation site. The support structure may include support columns or other support structure, an example of which includes the support columns 306. The drive linkage may be positioned at or below the installation surface, an example of which includes the leftmost drive linkage 304. The drive linkage may be configured to transmit mechanical power between the first and second solar trackers. The first interconnection assembly may operably couple a first end of the drive linkage at or below an installation surface to the first drive assembly supported above the installation surface by the support structure, an example of which includes the middle interconnection assembly 308. The second interconnection assembly may operably couple a second end of the drive linkage at or below the installation surface to the second drive assembly supported above the installation surface by the second support column, an example of which includes the leftmost interconnection assembly 308.

At least one other embodiment herein may include a method of operating and/or installing a solar array. The method may include transmitting mechanical power through a drive linkage located at or below an installation surface of a solar array to an interconnection assembly operably coupled to the drive linkage. The mechanical power may be transmitted vertically upward through the interconnection assembly to a drive assembly operably coupled to a torsion tube of the solar array. The torsion tube may be rotated in response to receiving the mechanical power at the drive assembly. The method may also include rotating solar modules of the solar array that are coupled to the torsion tube in response to rotating the torsion tube. Transmitting the mechanical power through the drive linkage located at or below the installation surface may include transmitting the mechanical power through a drive linkage housing that at least partially encloses the drive linkage. The method may additionally include digging a trench through the installation surface and installing the drive linkage in the housing within the trench below the installation surface and/or burying the drive linkage in the housing below the installation surface. The method may alternatively include installing the drive linkage in the housing on the installation surface by coupling the housing to the installation surface (e.g., using screws, earth screws, masonry screws, bolts, lag bolts, anchors, concrete anchors, expanding anchors, nails, or the like). The method may further include transmitting the mechanical power vertically downward from the drive assembly through a second interconnection assembly to a second drive linkage located at or below the installation surface and operably coupled to the second interconnection assembly. The mechanical power may be transmitted through the second drive linkage to a third interconnection assembly operably coupled to the second drive linkage. The mechanical power may be transmitted vertically upward through the third interconnection assembly to a second drive assembly operably coupled to a second torsion tube of the solar array. The second torsion tube may be rotated in response to receiving the mechanical power at the second drive assembly. A second set of solar modules of the solar array that are coupled to the second torsion tube may be rotated in response to rotating the second torsion tube.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A solar array, comprising
    a first solar tracker comprising a first torsion tube and a first drive assembly, the first drive assembly operably coupled to the first torsion tube to rotate the first torsion tube responsive to input mechanical power;
    a second solar tracker comprising a second torsion tube and a second drive assembly, the second drive assembly operably coupled to the second torsion tube to rotate the second torsion tube responsive to input mechanical power;
    a support structure that supports the first and second solar trackers above an installation surface;
    a drive linkage positioned at or below the installation surface on which the entire solar array is installed, the drive linkage configured to transmit mechanical power between the first and second solar trackers;
    a first interconnection assembly that operably couples a first end of the drive linkage at or below the installation surface to the first drive assembly supported above the installation surface by the support structure; and
    a second interconnection assembly that operably couples a second end of the drive linkage at or below the installation surface to the second drive assembly supported above the installation surface by the support structure.

2. The solar array of claim 1, further comprising a housing that at least partially encloses and protects the drive linkage.

3. The solar array of claim 2, wherein the housing comprises a raceway installed on the installation surface.

4. The solar array of claim 2, wherein the housing comprises a conduit, the conduit and the drive linkage buried beneath the installation surface.

5. The solar array of claim 1, wherein the first drive assembly comprises a worm gear with an end shaft and the first interconnection assembly comprises:
    an upper sprocket operably coupled to the end shaft of the worm gear;
    a lower sprocket operably coupled to the first end of the drive linkage; and
    a drive chain that operably couples the upper and lower sprockets together.

6. The solar array of claim 1, wherein:
    the first interconnection assembly is configured to relocate mechanical power transmitted through the first drive assembly from the first solar tracker above the installation surface to the drive linkage positioned at or below the installation surface; and
    the second interconnection assembly is configured to relocate mechanical power transmitted through the drive linkage from the drive linkage positioned at or below the installation surface to the second solar tracker above the installation surface.

7. The solar array of claim 6, further comprising a drive motor operably coupled to the first interconnection assembly and configured to output the mechanical power to the first interconnection assembly.

8. The solar array of claim 1, wherein the second drive assembly comprises:
    a worm gear configured to rotate in response to input mechanical power from the second interconnection assembly;
    a first spur gear that meshes with the worm gear and is configured to rotate in response to rotation of the worm gear;
    a second spur gear formed on or coupled to a same shaft as the first spur gear, the first and second spur gears sharing a common axis, the second spur gear configured to rotate in response to rotation of the first spur gear; and a sector gear mounted to the second torsion tube, the sector gear meshing with the second spur gear and configured to rotate itself and the second torsion tube in response to rotation of the second spur gear.

9. A solar array, comprising
a first solar tracker comprising a first torsion tube and a first drive assembly, the first drive assembly operably coupled to the first torsion tube to rotate the first torsion tube responsive to input mechanical power;
a second solar tracker comprising a second torsion tube and a second drive assembly, the second drive assembly operably coupled to the second torsion tube to rotate the second torsion tube responsive to input mechanical power;
a support structure that supports the first and second solar trackers above an installation surface;
a drive linkage positioned at or below the installation surface on which the entire solar array is installed, the drive linkage configured to transmit mechanical power between the first and second solar trackers, the drive linkage positioned spaced apart from and below, relative to gravity, the first drive assembly and the second drive assembly;
a first interconnection assembly that operably couples a first end of the drive linkage at or below the installation surface on which the entire solar array is installed to the first drive assembly supported above the installation surface by the support structure;
a second interconnection assembly that operably couples a second end of the drive linkage at or below the installation surface on which the entire solar array is installed to the second drive assembly supported above the installation surface by the support structure; and
a housing that at least partially encloses and protects the drive linkage, wherein the housing comprises one of:
a raceway installed on the installation surface; or
a conduit, the conduit and the drive linkage buried beneath the installation surface;
wherein the first drive assembly comprises a first rotational axis spaced apart from and non-coaxial with a rotational axis of the drive linkage and a second rotational axis arranged orthogonal to the first rotational axis and parallel to a rotational axis of the first torsion tube; and
wherein the first interconnection assembly comprises a third rotational axis coaxial with the first rotational axis of the first drive assembly and a fourth rotational axis spaced apart from and non-coaxial with the third rotational axis, the fourth rotational axis of the first interconnection assembly located, relative to gravity, vertically below the third rotational axis.

10. The solar array of claim 9, wherein the housing comprises the raceway, the raceway comprising:
an elongate enclosure open at opposing first and second ends, the drive linkage extending between the first and second ends of the enclosure; and
elongate ramped surfaces extending between the first and second ends on opposing sides of the enclosure.

11. The solar array of claim 9, wherein the housing comprises the conduit, the conduit comprising a below-ground conduit installed in a trench and buried beneath the installation surface.

12. The solar array of claim 9, further comprising first and second pillow block bearings rotatably supporting opposing ends of the drive linkage, the first and second pillow block bearings coupled to at least one of the housing or the installation surface.

13. A solar array, comprising
a first solar tracker comprising a first torsion tube and a first drive assembly, the first drive assembly operably coupled to the first torsion tube to rotate the first torsion tube responsive to input mechanical power;
a second solar tracker comprising a second torsion tube and a second drive assembly, the second drive assembly operably coupled to the second torsion tube to rotate the second torsion tube responsive to input mechanical power;
a support structure that supports the first and second solar trackers above an installation surface;
a drive linkage positioned at or below the installation surface on which the entire solar array is installed, the drive linkage configured to transmit mechanical power between the first and second solar trackers, the drive linkage positioned spaced apart from and below, relative to gravity, the first drive assembly and the second drive assembly;
a first interconnection assembly that operably couples a first end of the drive linkage at or below the installation surface on which the entire solar array is installed to the first drive assembly supported above the installation surface by the support structure;
a second interconnection assembly that operably couples a second end of the drive linkage at or below the installation surface on which the entire solar array is installed to the second drive assembly supported above the installation surface by the support structure; and
a housing that at least partially encloses and protects the drive linkage, wherein the housing comprises a raceway installed on the installation surface or a conduit and the conduit and the drive linkage are buried beneath the installation surface;
wherein the first drive assembly comprises:
a worm gear with an end shaft;
a first spur gear that meshes with the worm gear and is configured to rotate in response to rotation of the worm gear;
a second spur gear formed on or coupled to a same shaft as the first spur gear, the first and second spur gears sharing a common rotational axis, the second spur gear configured to rotate in response to rotation of the first spur gear; and
a sector gear mounted to the first torsion tube, the sector gear meshing with the second spur gear and configured to rotate itself and the second torsion tube in response to rotation of the second spur gear; and
wherein the first interconnection assembly comprises:
an upper sprocket operably coupled to the end shaft of the worm gear, the upper sprocket having a first rotational axis that is coaxial with a second rotational axis of the end shaft of the worm gear;
a lower sprocket operably coupled to the first end of the drive linkage, the lower sprocket having a third rotational axis that is parallel to and below, relative to gravity, the first rotational axis of the upper sprocket; and
a drive chain that operably couples the upper and lower sprockets together, each of the upper and lower sprockets comprising teeth that mesh with the drive chain such that rotation of the upper sprocket or the lower sprocket is vertically translated, relative to gravity, by the drive chain to the other of the lower sprocket or the upper sprocket.

14. The solar array of claim 13, wherein the housing comprises the raceway, the raceway comprising:
- an elongate enclosure open at opposing first and second ends, the drive linkage extending between the first and second ends of the enclosure; and
- elongate ramped surfaces extending between the first and second ends on opposing sides of the enclosure.

15. The solar array of claim 13, wherein the housing comprises the conduit, the conduit comprising a below-ground conduit installed in a trench and buried beneath the installation surface.

16. The solar array of claim 13, further comprising first and second pillow block bearings rotatably supporting opposing ends of the drive linkage, the first and second pillow block bearings coupled to at least one of the housing or the installation surface.

\* \* \* \* \*